US009360886B2

(12) United States Patent
Hsu et al.

(10) Patent No.: US 9,360,886 B2
(45) Date of Patent: Jun. 7, 2016

(54) CASE ASSEMBLY

(71) Applicant: TPV-INVENTA Technology Co., Ltd., Taipei (TW)

(72) Inventors: Shao-Tzu Hsu, Taipei (TW); Chia-Lin Tsai, Taipei (TW); Chun-An Wu, Taipei (TW)

(73) Assignee: TPV-INVENTA TECHNOLOGY CO., LTD., Taipei (TW)

( * ) Notice: Subject to any disclaimer, the term of this patent is extended or adjusted under 35 U.S.C. 154(b) by 0 days.

(21) Appl. No.: 14/671,498

(22) Filed: Mar. 27, 2015

(65) Prior Publication Data

US 2016/0044810 A1 Feb. 11, 2016

(30) Foreign Application Priority Data

Aug. 8, 2014 (TW) .............................. 103214228 U

(51) Int. Cl.
*G06F 1/16* (2006.01)
(52) U.S. Cl.
CPC ........................................ *G06F 1/16* (2013.01)
(58) Field of Classification Search
CPC .................................................... G06F 1/1601
See application file for complete search history.

(56) References Cited

U.S. PATENT DOCUMENTS

| 2014/0226265 A1* | 8/2014 | Ito | G02F 1/133308 |
| | | | 361/679.01 |
| 2014/0340587 A1* | 11/2014 | Ejiri | H04N 5/64 |
| | | | 348/794 |
| 2015/0208529 A1* | 7/2015 | Sakong | H05K 5/0017 |
| | | | 361/679.01 |

\* cited by examiner

*Primary Examiner* — Anthony Q Edwards
(74) *Attorney, Agent, or Firm* — Locke Lord LLP; Tim Tingkang Xia, Esq.

(57) ABSTRACT

A case assembly of an electronic device includes a first outer case and an inner case. The first outer case includes a holding groove and a holding plate for forming the holding groove. The holding plate includes a touching surface and a pressing surface that are opposite to each other, and the touching surface forms a part of the holding groove. The inner case is disposed on one side of the first outer case. The inner case includes a surface and at least one supporting component protruding from the surface. The at least one supporting component abuts against the pressing surface, and the inner case and the at least one supporting component are integrated together.

10 Claims, 5 Drawing Sheets

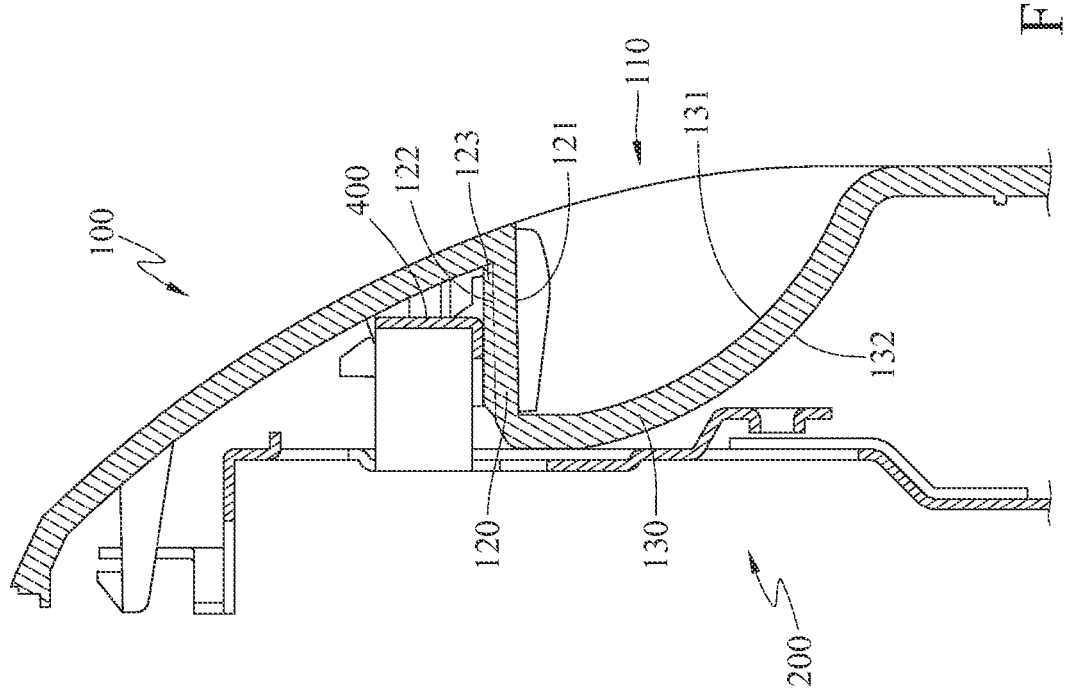

CASE ASSEMBLY

CROSS-REFERENCE TO RELATED APPLICATIONS

This non-provisional application claims priority under 35 U.S.C. §119(a) on Patent Application No(s). 103214228 filed in Taiwan, R.O.C. on Aug. 8, 2014, the entire contents of which are hereby incorporated by reference.

TECHNICAL FIELD

The disclosure relates to an electronic device, more particularly to an electronic device with a fast detachable case assembly.

BACKGROUND

With the development of technology, electronic devices are improved in order to have more functions. For example, the electronic device is developed to be carried conveniently since users always use the electronic device at different locations. Furthermore, the strength of a holding part for carrying the electronic device also needs to be improved.

Therefore, it is important to provide a case having a strengthened holding part so that the user is able to carry the electronic device conveniently.

SUMMARY

According to an embodiment of the disclosure, a case assembly of an electronic device comprises a first outer case and an inner case. The first outer case comprises a holding groove and a holding plate for forming the holding groove. The holding plate comprises a touching surface and a pressing surface that are opposite to each other, and the touching surface forms a part of the holding groove. The inner case is disposed on one side of the first outer case. The inner case comprises a surface and at least one supporting component protruding from the surface. The at least one supporting component abuts against the pressing surface, and the inner case and the at least one supporting component are integrated together.

BRIEF DESCRIPTION OF THE DRAWINGS

The present disclosure will become more fully understood from the detailed description given herein below, along with the accompanying drawings which are for illustration only, thus are not limitative of the present disclosure, and wherein:

FIG. 1E is a cross-sectional view of the case assembly along a line E-E in FIG. 1D.

DETAILED DESCRIPTION

Figure 1A:
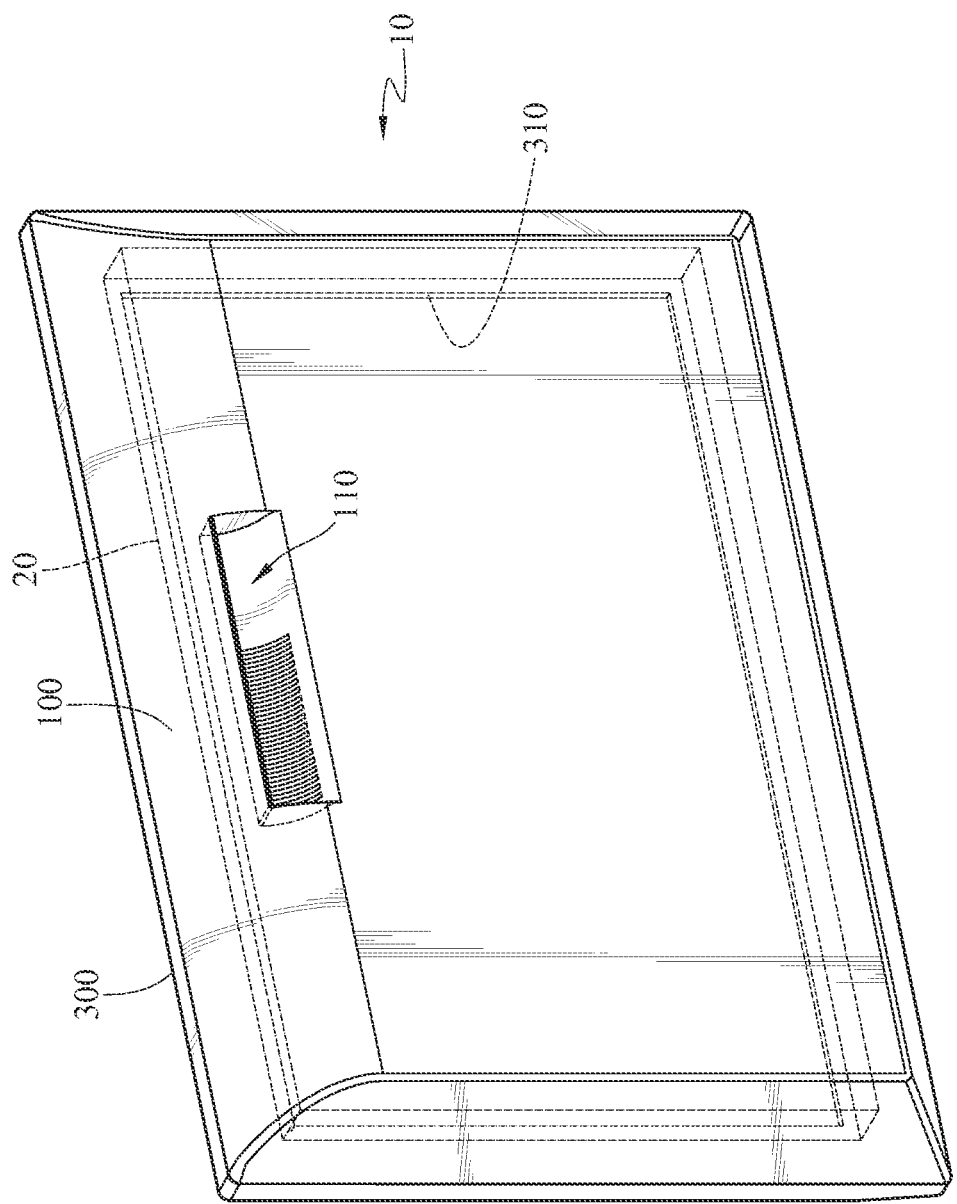
FIG. 1A is a perspective view of a case assembly with a display located inside thereof according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The disclosure has been described in detail with particular reference to an embodiment thereof, but it will be understood that variations and modifications can be effected within the spirit and scope of the disclosure. In this disclosure, the "first", "second", "third" used to describe the elements is not limited thereto. For example, a first element A in the embodiment can be named a second element A in other embodiments. Furthermore, relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Figure 1B:
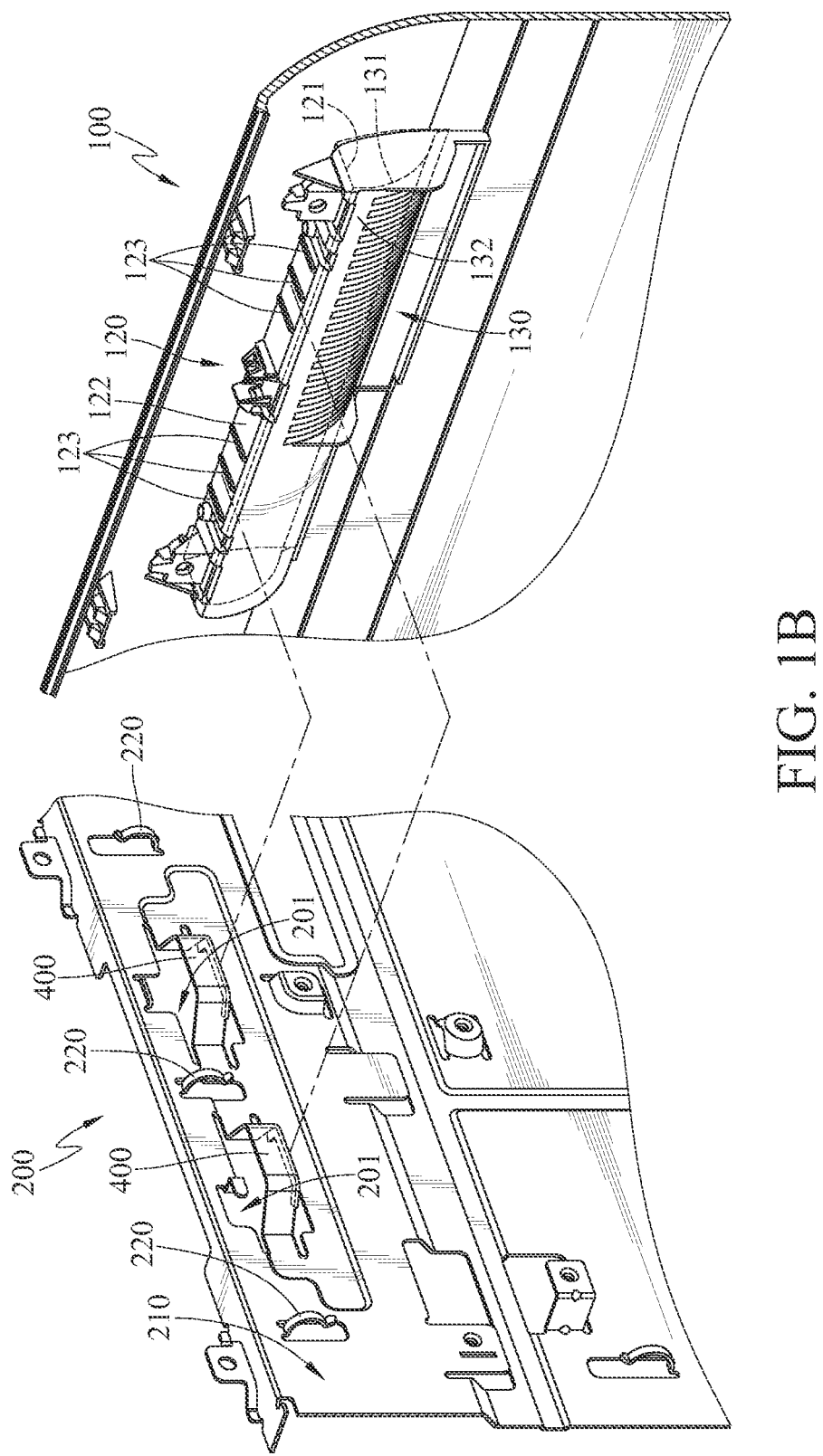
FIG. 1B is an exploded view of the case assembly according to the embodiment.
Figure 1C:
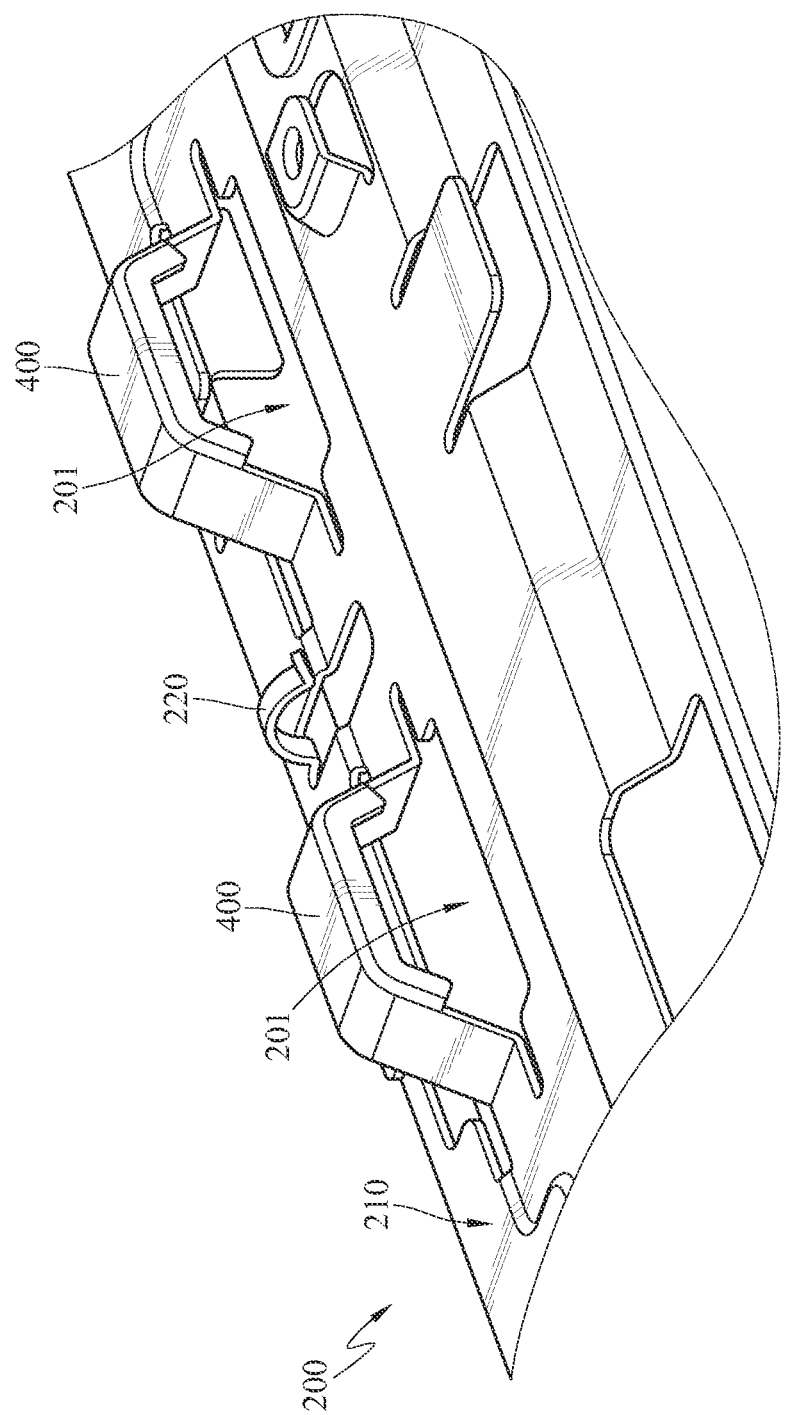
FIG. 1C is a partially perspective view of an inner case of the case assembly according to the embodiment.
Figure 1D:
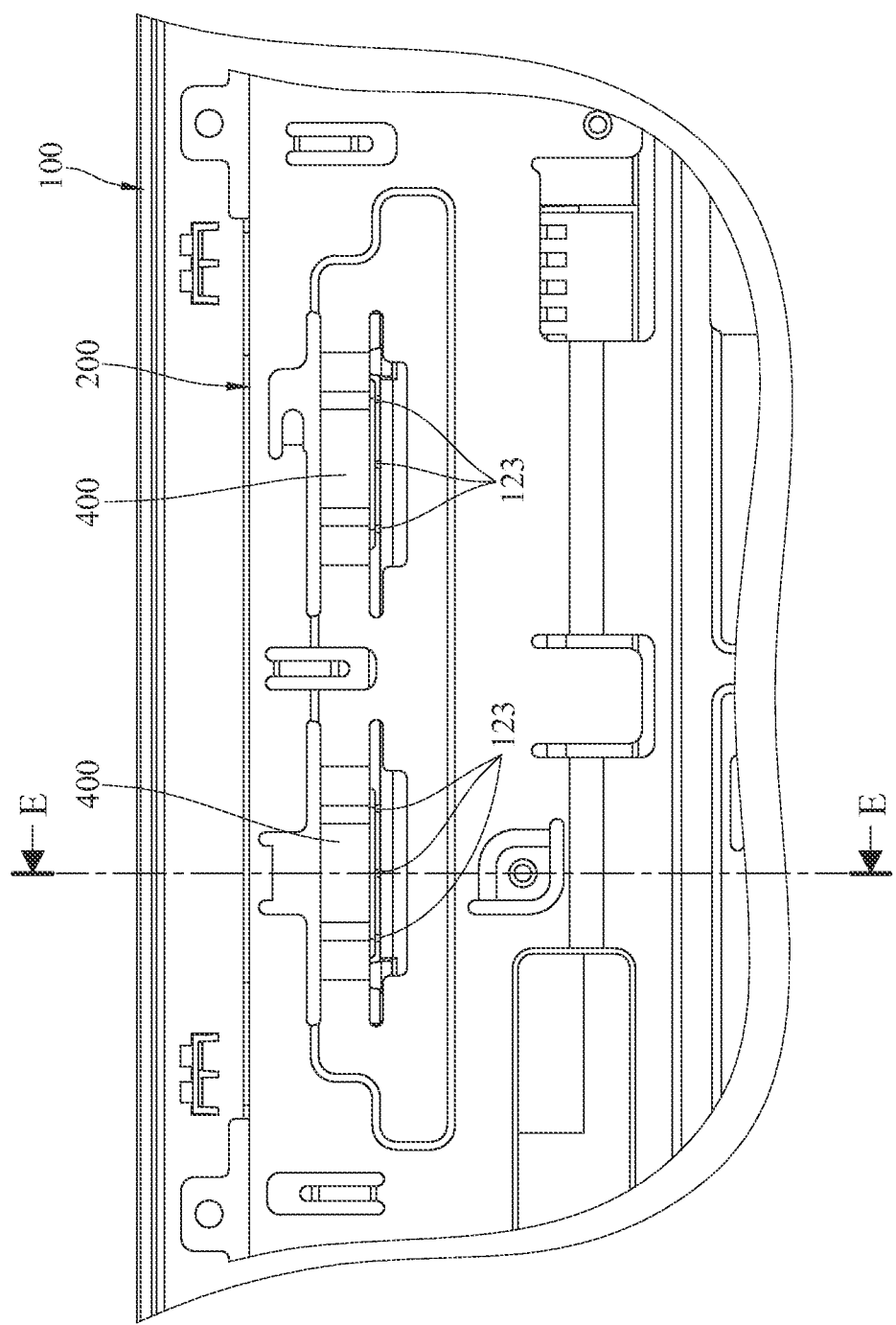
FIG. 1D is a top view of the case assembly according to the embodiment.

Please refer to FIGS. 1A, 1B, 1C, 1D, and 1E. FIG. 1A is a perspective view of a case assembly with a display located inside according to an embodiment. FIG. 1B is an explosive view of the case assembly according to the embodiment. FIG. 1C is a perspective view of an inner case according to the embodiment. FIG. 1D is a top view of the case assembly according to the embodiment. FIG. 1E is a cross-sectional view of along a line E-E in FIG. 1D. In this embodiment, a case assembly 10 of an electronic device (not numbered) comprises a first outer case 100 and an inner case 200. The first outer case 100 and the inner case 200 are, for example, made of metal. In this embodiment, the case assembly 10 further comprises a second outer case 300, but the disclosure is not limited thereto. In some other embodiments, the case assembly 10 does not comprise the second outer case 300. The electronic device is, for example, an All-in-One (AIO) computer, and the case assembly 10 is, for example, a cover of the AIO computer.

The first outer case 100 comprises a holding plate 120 and a connecting plate 130 that are connected to each other. Both of the holding plate 120 and the connecting plate 130 extends from the first outer case 100 toward the inner case 200 to form a holding groove 110 so that a user is able to insert his/her hand into the holding groove 110 to carry the electronic device. In this embodiment, the holding plate 120 and the connecting plate 130 form the holding groove 110 together, but the disclosure is not limited thereto. In some other embodiments, the first outer case 100 does not comprises the connecting plate 130, and the holding plate 120 form the holding groove 110. The holding plate 120 comprises a touching surface 121 and a pressing surface 122 that are opposite to each other, and the connecting plate 130 comprises a first connecting surface 131 and a second connecting surface 132 that are opposite to each other. The first connecting surface 131 is connected to the touching surface 121, and the second connecting surface 132 is connected to the pressing surface 122. Both of the first connecting surface 131 and the touching surface 121 are parts of an outer surface of the first outer case 100, and the first connecting surface 131 and the touching surface 121 form the holding groove 110 together. Moreover, both of the second connecting surface 132 and the pressing surface 122 are parts of an inner surface of the first outer case 100. Therefore, the user is adapted to insert into the contact holding groove 110 and contact the touching surface 121 by his/her hand so as to grab and carry the electronic device. In this embodiment, the first connecting surface 131 is a curved surface so that it is ergonomic for the user to insert his/her hand into the holding groove 110 more conveniently.

The inner case 200 is disposed on one side of the first outer case 100. The inner case 200 comprises a surface 210 and two supporting components 400. The two supporting components 400 protrude from the surface 210. The second connecting surface 132 of the connecting plate 130 faces towards the surface 210. The inner case 200 has two openings 201 corresponding to the two supporting components 400, respectively. Two opposite ends of the supporting component 400 are connected to two opposite ends of the opening 201, respectively. In this embodiment, the supporting component 400 and the opening 201 are formed by performing a punching process on a part of the inner case 200. That is, the inner case 200 and the supporting component 400 are integrated together into a single unit. When the inner case 200 and the supporting component 400 are integrated together, additional fixing components are avoided. Accordingly, the inner case 200 has more additional space for disposition other components, and therefore there is a distance between the two supporting components 400. In this embodiment, the number of the supporting components 400 is two, but the disclosure is not limited thereto. In some other embodiments, for example, the number of the supporting component 400 is one. The supporting component 400 abuts against the pressing surface 122 of the holding plate 120 so as to distribute an overloading force applied on the touching surface 121 of the holding plate 120 when the user contacts the touching surface 121 to grab and carry the electronic device. Therefore, the supporting component 400 is favorable for strengthening the holding plate 120 so as to prevent the holding plate 120 from deformation.

The second outer case 300 is assembled to the first outer case 100 so that both of the first outer case 100 and the second outer case 300 form two opposite side of the cover of the electronic device. In this embodiment, the second outer case 300 is assembled to the first outer case 100 so that the inner case 200 is located between the first outer case 100 and the second outer case 300. The second outer case 300 has a display window 310, and a screen 20 is located between the first outer case 100 and the second outer case 300. Therefore, the display window 310 corresponds to the screen 20 so that the screen 20 is able to expose to outside from the display window 310 so as to provide an image to users.

Furthermore, the inner case 200 further comprises three cable-management racks 220. All of the three cable-management racks 220 and the two supporting components 400 protrude from the same side of the inner case 200. That is, all of the cable-management racks 220 and the supporting components 400 protrude from the inner case 200 towards the first outer case 100. One of the three cable-management racks 220 is located between the two supporting components 400. In this embodiment, the inner case 200 and the supporting component 400 are integrated together into a single unit so that the distance between the two supporting components 400 is able to provide enough space for accommodating one of the cable-management racks 220. Therefore, it is favorable for disposing the other components on the inner case 200.

Moreover, the holding plate 120 further comprises six ribs 123 disposed on the pressing surface 122. Each of the two supporting components 400 abuts against corresponding three of the six ribs 123, respectively. That is, one of the two supporting components 400 abuts against three of the six ribs 123, and the other one of the two supporting components 400 abuts against the other three of the six ribs 123. The ribs 123 are favorable for further strengthening the holding plate 120 so as to prevent the holding plate 120 from deformation. In this embodiment, the number of the ribs 123 is six, but the disclosure is not limited thereto. In some other embodiments, for example, the number of the rib 123 is one or more than one.

According to an embodiment of the disclosure, a first outer case of a case assembly has a holding groove so that a user is able to carry an electronic device conveniently by inserting his/her hand into the holding groove. Furthermore, a supporting component of an inner case abuts against a pressing surface of a holding plate of the first outer case so that it is favorable for strengthening the case assembly. Moreover, the inner case and the supporting component are integrated together into a single unit so as to further strengthen the case assembly and reduce manufacturing time and cost.

In addition, the inner case and the two supporting components are integrated together into a single unit so that there is enough space between the supporting components for disposing the cable-management rack. Therefore, other components can be disposed between the supporting components so the space of the case assembly is well arranged.

What is claimed is:

1. A case assembly of an electronic device, comprising:
   a first outer case comprising a holding groove and a holding plate for forming the holding groove, the holding plate comprising a touching surface and a pressing surface that are opposite to each other, and the touching surface forming a part of the holding groove; and
   an inner case disposed on one side of the first outer case, the inner case comprising a surface and at least one supporting component protruding from the surface, the at least one supporting component abutting against the pressing surface, and the inner case and the at least one supporting component being integrated together.

2. The case assembly according to claim 1, wherein the first outer case further comprises a connecting plate for forming the holding groove with the holding plate, the connecting plate is connected to the holding plate, the connecting plate comprises a first connecting surface and a second connecting surface that are opposite to each other, the first connecting surface is connected to the touching surface, the second connecting surface is connected to the pressing surface, and the second connecting surface faces toward the inner case.

3. The case assembly according to claim 1, wherein the holding plate comprises at least one rib disposed on the pressing surface, and the at least one supporting component abuts against the at least one rib.

4. The case assembly according to claim 3, wherein the inner case has at least one opening, and opposite two ends of the at least one supporting component are connected to two opposite ends of the opening, respectively.

5. The case assembly according to claim 1, wherein the number of the at least one supporting component is two.

6. The case assembly according to claim 5, wherein the inner case further comprises at least one cable-management rack, and both of the at least one cable-management rack and the two supporting components protrude from the same side of the inner case.

7. The case assembly according to claim 6, wherein the at least one cable-arrangement rack is located between the two supporting components.

8. The case assembly according to claim 5, wherein the holding plate comprises six ribs disposed on the pressing surface, one of the two supporting components abuts against three of the six ribs, and the other one of the two supporting components abuts against the other three of the six ribs.

9. The case assembly according to claim 1, further comprising a second outer case assembled to the first outer case, the inner case being located between the first outer case and the second outer case, and the second outer case comprising a display window.

10. The case assembly according to claim 1, wherein the first outer case and the inner case are made of metal.

* * * * *